W. F. SHARBAUGH.
SAFETY MILK CAN SPOUT.
APPLICATION FILED MAY 6, 1920.
1,393,250. Patented Oct. 11, 1921.
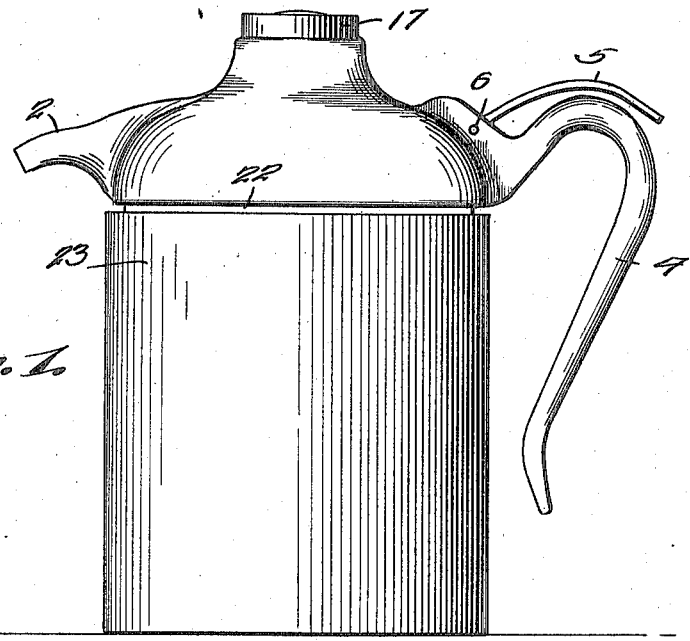
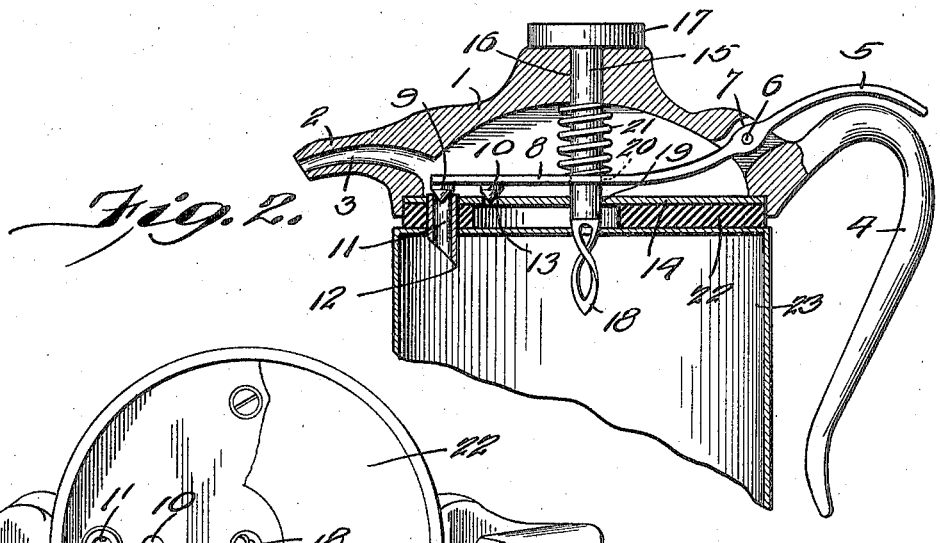
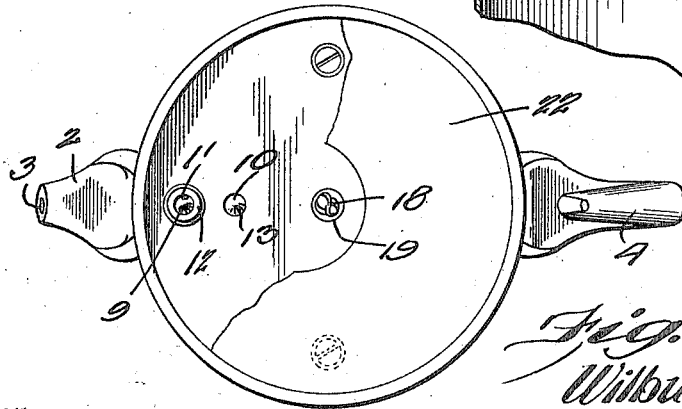
Inventor
Wilbur F. Sharbaugh
By Jerry A. Mathews
and Lester L. Sargent.
Attorneys ately disposed and formed integral with the cover; a

UNITED STATES PATENT OFFICE.

WILBUR F. SHARBAUGH, OF WHEELING, WEST VIRGINIA.

SAFETY MILK-CAN SPOUT.

1,393,250.　　　　　Specification of Letters Patent.　　Patented Oct. 11, 1921.

Application filed May 6, 1920. Serial No. 379,321.

*To all whom it may concern:*

Be it known that I, WILBUR F. SHARBAUGH, a citizen of the United States, and resident of Wheeling, in the county of Ohio and State of West Virginia, have invented a new and useful Safety Milk-Can Spout, of which the following is a specification.

The object of my invention is to provide a novel cover for a condensed milk can, adapted to fit tightly on the can of milk, giving it the appearance of an aluminum milk pitcher, and to provide novel means for adjusting the release lever. I attain these and other objects of my invention by the device illustrated in the accompanying drawings, in which—

Figure 1 is a side elevation of the invention;

Fig. 2 is a vertical section, partly in elevation; and

Fig. 3 is a bottom plan, with a part of member 22 broken away.

Like numerals designate like parts in each of the views.

Referring to the accompanying drawings I provide a suitable ornamental pitcher cover or top 1, preferably of aluminum, having a spout 2, with a channel 3, and a handle 4. The portion of the cover adjacent the handle is provided with a slot 7, through which extends the release lever 5, which is mounted by means of pivot 6 to the cover 1. The operating end 8 of lever 5 is provided with a suitable stopper 9 adapted to seat on the upper end of outlet tube 11, and spaced from member 9 and also attached to member 8 is a stopper 10 seating on a suitable air opening 13 in disk 14, to facilitate the flow of fluid from the can. I provide a suitable large rubber washer or ring 22 frictionally engaged over outlet tube 11 and seating on the top of the can 23, as shown. Mounted on the central portion of the cover 1 in the opening 16 is a can opening shaft 15 provided on its upper end with the turning knob 17, and on its lower end with a suitable twist screw or auger 18 for penetrating the top of the can, member 18 being slotted as shown, preferably. Operating portion 8 of lever 5 is provided with a suitable slot 20 through which shaft 15 passes. I provide a spring 21 bearing on member 8 and normally holding the stoppers 9 and 10 in closed position, as shown in Fig. 2. Outlet tube 11 is provided with a pointed end 12 to enable it to penetrate the top of the can 23, as shown in Fig. 2.

When lever 5 is pressed portion 8 of the lever is raised and stoppers 9 and 10 are released from their seats on outlet tube 11 and opening 13, allowing the contents of the can to flow through outlet tube 11 and channel 3 of spout 2. Outlet tube 11 and opening 13 are normally kept closed, in consequence of the pressure exerted by spring 21 on portion 8 of release lever 5. The device is primarily designed for use on condensed milk cans, the cover 1 being of aluminum and attractively designed as shown to give the can the appearance of an aluminum milk pitcher.

What I claim is:

1. In a device of the class described, the combination of an ornamental cover, a spout opening out of the cover, a handle integral with the cover, a release lever pivoted on the cover, a disk attached to the cover, an outlet tube in the disk in proximity to the spout, an opening in the disk, stoppers mounted on the release lever and normally closing the outlet tube and the aforesaid opening in the disk, resilient means normally holding the release lever in closed position, and a can penetrating shaft having an auger member on its lower end and a turning knob on its upper end.

2. In a device of the class described, the combination of a cover of suitable size to engage over the top of a can, a spout, an oppositely disposed handle, a releasing lever pivotally mounted on the cover, stoppers carried by said lever, a disk mounted within the cover, a pointed outlet tube mounted on said disk and adapted to project through the top of the can, an air inlet in the disk positioned to be opened and closed by one of the stoppers, a spring normally holding the releasing lever and stoppers in closed position, a rubber ring engaged over the outlet tube and providing a seating member for the cover on the can, a can opening shaft mounted on a central portion of the cover, said shaft having a slotted auger member and an operating knob at the other end, substantially as set forth.

3. In a device of the class described, an ornamental pitcher-like cover for milk cans having a spout and a handle oppositely disposed and formed integral with the cover, a disk mounted on the cover, an outlet tube of sufficient length to penetrate the top of the can, said outlet being mounted on the disk, the disk having an air inlet spaced from the outlet tube, a releasing lever pivotally mounted on the cover and carrying spaced stoppers normally seating on and closing an outlet tube and air inlet, a rubber washer frictionally engaging the outlet tube and providing a seating member for the cover on the can, an auger member for penetrating the top of the can to admit air, and a spring normally holding the releasing lever in closed position, said spring being held in place by the shaft of the auger lever, substantially as set forth.

WILBUR F. SHARBAUGH.